United States Patent
Dickinson et al.

(10) Patent No.: US 7,560,845 B2
(45) Date of Patent: Jul. 14, 2009

(54) ROTOR FOR A SWITCHED RELUCTANCE MACHINE

(75) Inventors: Phillip George Dickinson, North Yorkshire (GB); Norman Neilson Fulton, North Yorkshire (GB)

(73) Assignee: Switched Reluctance Drives Limited, North Yorkshire (GB)

( * ) Notice: Subject to any disclaimer, the term of this patent is extended or adjusted under 35 U.S.C. 154(b) by 1 day.

(21) Appl. No.: 11/532,938

(22) Filed: Sep. 19, 2006

(65) Prior Publication Data

US 2007/0063608 A1 Mar. 22, 2007

(30) Foreign Application Priority Data

Sep. 19, 2005 (GB) ................... 0519091.3

(51) Int. Cl.
 *H02K 1/22* (2006.01)
(52) U.S. Cl. .................... 310/216; 310/218; 310/266
(58) Field of Classification Search ................. 310/166, 310/168, 42, 44, 261, 216–218, 265–266
See application file for complete search history.

(56) References Cited

U.S. PATENT DOCUMENTS

| | | | | |
|---|---|---|---|---|
| 3,321,652 A | * | 5/1967 | Opel | 310/168 |
| 3,389,281 A | * | 6/1968 | Ellis | 310/168 |
| 4,513,216 A | * | 4/1985 | Muller | 310/156.68 |
| 4,757,224 A | * | 7/1988 | McGee et al. | 310/168 |
| 5,162,685 A | * | 11/1992 | Yamaguchi et al. | 310/156.28 |
| 5,828,153 A | | 10/1998 | McClelland | |
| 6,897,588 B2 | * | 5/2005 | Okubo | 310/156.36 |
| 6,935,373 B2 | * | 8/2005 | Wygnanski | 137/625.44 |
| 2004/0070301 A1 | | 4/2004 | Mecrow | |
| 2007/0001533 A1 | * | 1/2007 | Jansen et al. | 310/156.19 |

FOREIGN PATENT DOCUMENTS

GB 2157089 A * 10/1985
JP 07163105 A * 6/1995

OTHER PUBLICATIONS

Stephenson, J.M., et al., "The Characteristics, Design and Applications of Switched Reluctance Motors and Drives," PCIM '93 Conference and Exhibition, Jun. 21-24, 1993, Nürnberg, Germany.
Miller, T.J.E., "Electronic Control of Switched Reluctance Machines," Newnes Power Engineering Series, 2001, pp. 92-97.

(Continued)

*Primary Examiner*—Tran N Nguyen
(74) *Attorney, Agent, or Firm*—Senniger Powers LLP

(57) ABSTRACT

A rotor for a switched reluctance machine has its main magnetic circuit provided by two mouldings of soft magnetic composite. The mouldings are substantially identical and fit together to form a magnetic circuit which, by virtue of its design, has a very low inductance in the unaligned position. The portions of the magnetic circuit lie beyond the active length of the rotor poles and the flux path is described in three dimensions.

19 Claims, 8 Drawing Sheets

OTHER PUBLICATIONS

Hultman, et al., "Soft Magnetic Composites—Materials and Applications," IEMDC Conference, Madison, Wisconsin, USA, Jun. 1-4, 2004, vol. 1, pp. 516-522.

Alaküla, M., et al., "An Iron Composite Based Switched Reluctance Machine," Stockholm Power Tech, International Symposium on Electric Power Engineering, Jun. 18-22, 1995, vol. 3, pp. 251-255.

Duhayon, E., et al., "Design of a High Speed Switched Reluctance Generator for Aircaft Applications," ICEM 2002, International Conference on Electrical Machines, Brugge, Belgium, Aug. 25-28, 2002, 4 pages.

* cited by examiner

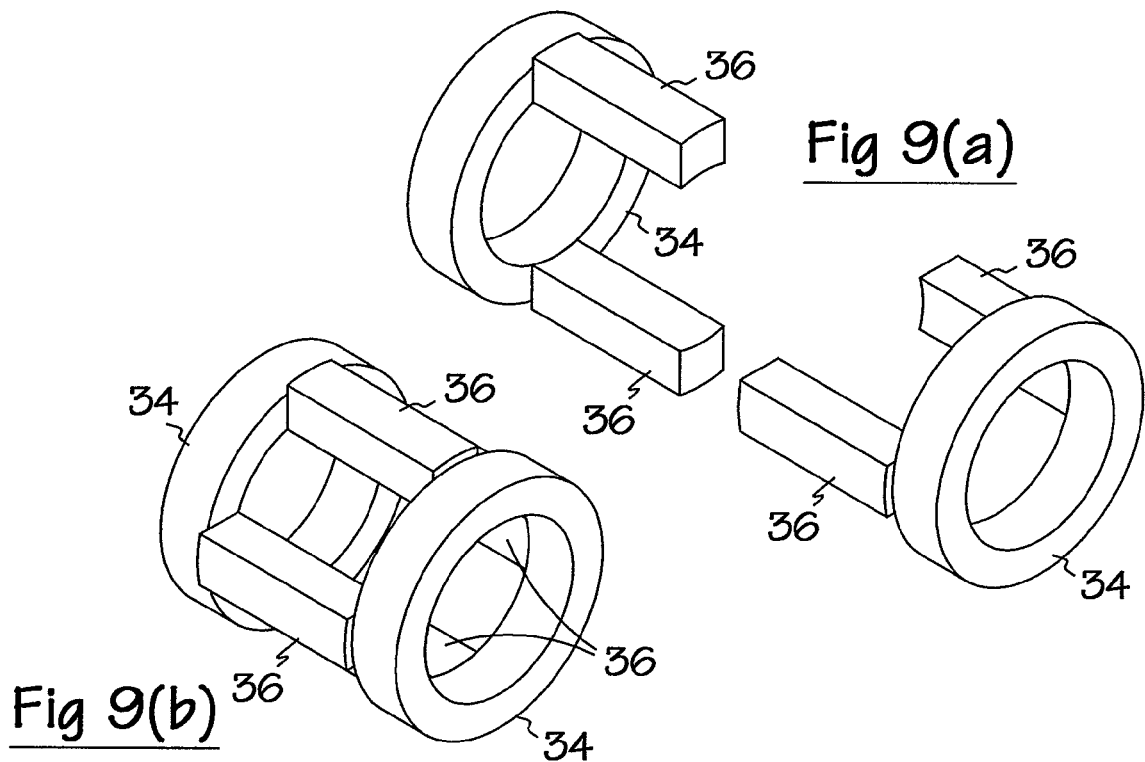
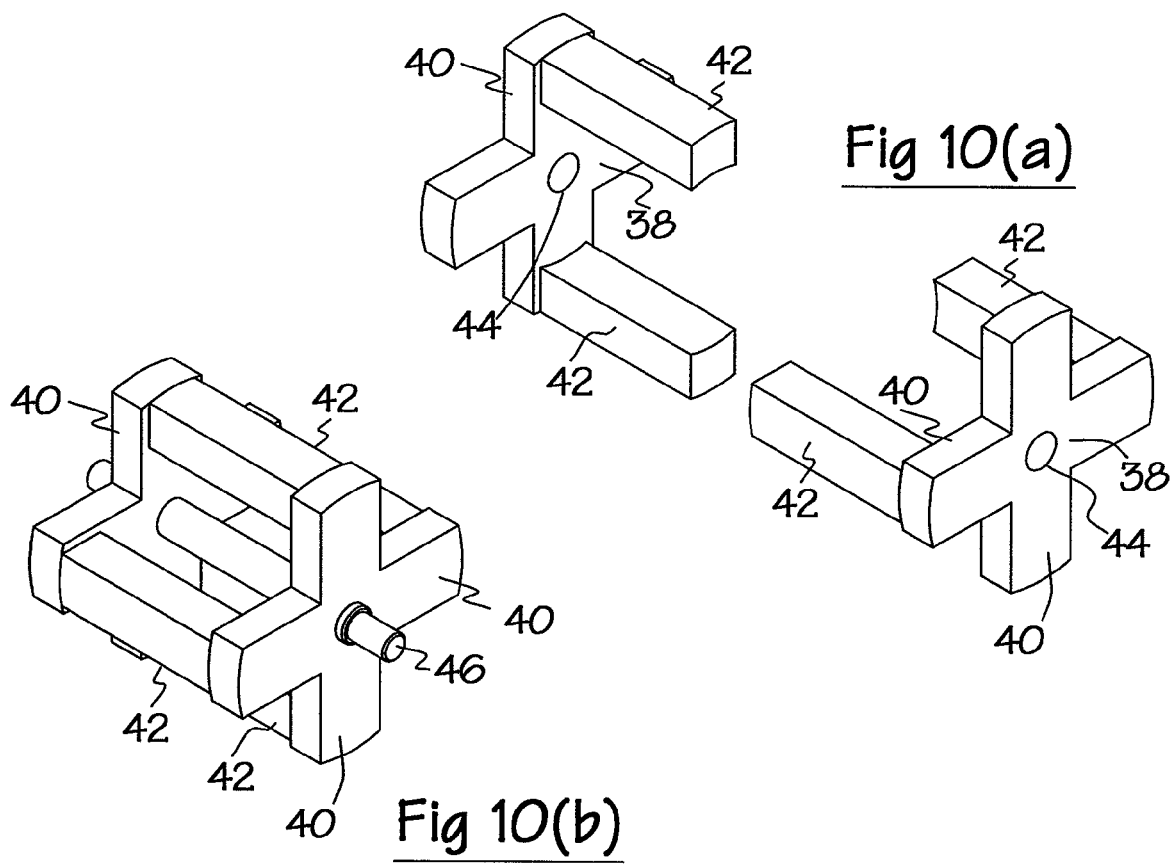

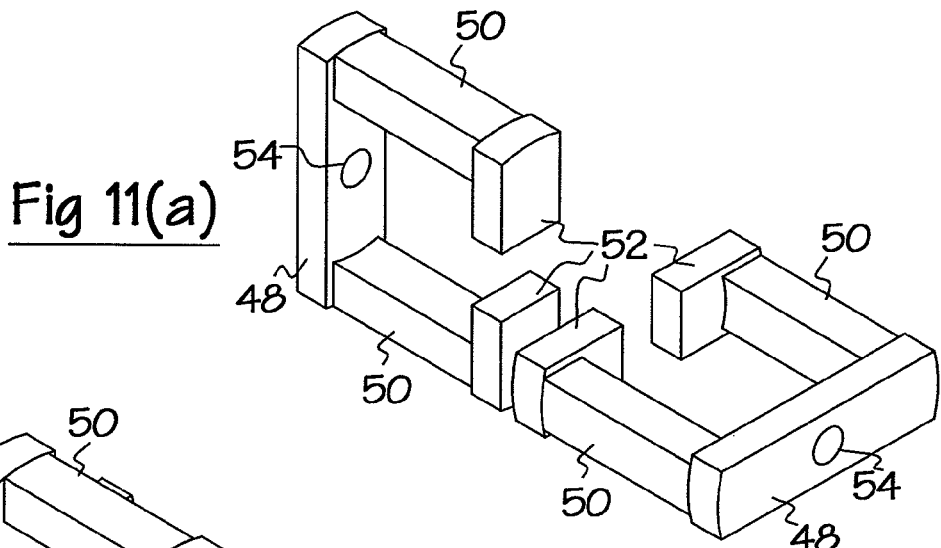
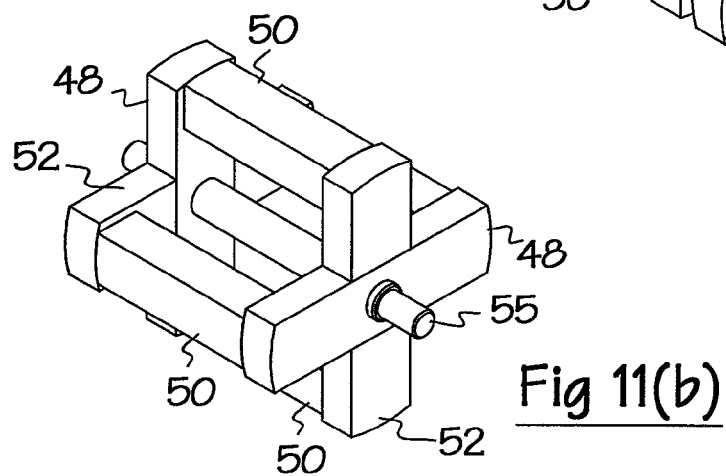
Fig 11(a)
Fig 11(b)
Fig 12(a)
Fig 12(b)

ROTOR FOR A SWITCHED RELUCTANCE MACHINE

BACKGROUND OF THE INVENTION

The present invention generally relates to the design of rotors for variable reluctance machines.

The switched reluctance machine (motor or generator) is a form of variable reluctance machine. The characteristics and operation of switched reluctance systems are well known in the art and are described in, for example, "The characteristics, design and application of switched reluctance motors and drives" by Stephenson and Blake, PCIM'93, Nürnberg, 21-24 Jun. 1993, incorporated herein by reference. A general treatment of the drives can also be found in various textbooks, e.g. "Electronic Control of Switched Reluctance Machines" by T J E Miller, Newnes, 2001. FIG. 1 shows a typical switched reluctance drive in schematic form, where the switched reluctance machine 12 is connected to a load 19. The DC power supply 11 can be either a battery or rectified and filtered AC mains or some other form of energy storage. The DC voltage provided by the power supply 11 is switched across the phase windings 16 of the machine 12 by a power converter 13 under the control of the electronic control unit 14.

The switching must be correctly synchronised to the angle of rotation of the rotor for proper operation of the drive, and a rotor position detector 15 is typically employed to supply signals corresponding to the angular position of the rotor. Sensorless techniques for determining rotor position are also known to the person of ordinary skill in the art. Thus, the rotor position detector 15 may take many forms, including that of a software algorithm, and its output may also be used to generate a speed feedback signal. The presence of the position detector and the use of an excitation strategy which is completely dependent on the instantaneous position of the rotor leads to the generic description of "rotor position switched" for these machines.

One of the many known converter topologies is shown in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter. A resistor 28 is connected in series with the lower switch 22 to provide a non-isolated current feedback signal. An alternative current measurement arrangement 18 giving an isolated signal is shown in FIG. 1. A multiphase system typically uses several of the "phase legs" of FIG. 2 connected in parallel to energise the phases of the electrical machine.

The phase inductance cycle of a switched reluctance machine is the period of the variation of inductance for the, or each, phase, for example between maxima when the rotor poles and the relevant respective stator poles are fully aligned. FIG. 3 shows a typical inductance profile in relation to a corresponding motoring current waveform. As described in the Stephenson paper above, the winding is switched on to the supply at a rotor position $\theta_{on}$ and removed from the supply at $\theta_{off}$. The inductance is shown in idealised form, whereas in practice the corners of the profile are rounded due to flux fringing in the air and to saturation of the ferromagnetic paths.

Electrical machines in general are constructed from laminations of electrical sheet steel, the resulting structure being used to carry the magnetic flux on which the machine depends for its operation. The structure is laminated to reduce the effect of eddy currents, which flow in the steel due to the time rate of change of the flux. Usually only machines with unvarying flux have unlaminated structures. For example, the field structure of a dc machine can be unlaminated (i.e. solid), though even in these machines a laminated structure is often adopted in order to reduce the transient response for a new operating condition. The degree of lamination is usually decided by the frequency of flux variation in the machine. For example, in a machine energised directly from the 50 or 60 Hz mains supply and operating at, say, 1500 or 1800 rev/min, a lamination thickness of 0.50 or 0.65 mm is often adopted. For a machine operating on a 400 Hz supply and running at 10000 rev/min, a lamination thickness of 0.20 mm might be selected.

Of course, the decreasing lamination thickness brings many disadvantages, not least in terms of cost of material and of manufacturing difficulty, but the designer is usually prepared to accept these handicaps in order to gain the benefits of reduced eddy current loss, higher efficiency and higher specific output.

The output of the machine is also dependent on the so-called magnetising characteristic of the steel used. This is the relationship between the magnetising effort applied to the steel (i.e. the magneto motive force, mmf) and the flux consequently produced. While there is a range of grades of steel from which the designer can choose, all of them have the same general feature in that the initial, generally linear, relationship between mmf and flux gradually deteriorates with increasing mmf to the point of significant non-linearity. In practical terms, this represents a limit on the amount of flux that the steel can usefully carry—a state generally described as "saturated", though this is not a particularly descriptive term, as there is no sharp cut-off in the relationship.

This magnetising characteristic of the steel becomes inseparably interrelated with the ideal characteristics of any machine in which the steel is used. For example, in a switched reluctance machine, the ideal inductance profile (discussed in the Stephenson paper above and shown in FIG. 3) takes on the steel characteristics and is significantly modified. This can be seen in the flux-linkage/angle/current relationships shown in FIG. 4, where the non-linearity of flux with current is immediately evident.

In general, the designers of electrical machines are under great pressure to design smaller and less costly machines to meet ever more demanding performance specifications. Size is important because it generally relates to both weight and cost, parameters which are important in the fields of, for example, aerospace and automobiles where fuel consumption is increasingly regarded as a major issue. At first sight, reducing the size for a given performance is simply achieved by working the steel harder, i.e. making it carry more flux in the given volume. Inspection of the curves of FIG. 4, however, shows that this results in a non-linear increase in the mmf, resulting in a non-linear increase in the ohmic losses of the machine and therefore in the thermal management problems associated with cooling. There is likely to be a consequential increase in the cost of the power converter for the machine. Thus there is clearly a practical limit that applies to the specific output of the machine.

A cross-section of a typical switched reluctance machine is shown in FIG. 5. The machine is doubly salient, i.e. both stator and rotor laminations have magnetically salient poles. In FIG. 5(a) the rotor is shown with a pair of poles fully aligned with the stator poles of Phase A. This represents the position of maximum inductance of the phase, often denoted $L_{max}$, as shown in FIG. 3. In FIG. 5(b) the rotor has been rotated to the position where an inter-polar axis of the rotor is aligned with the stator poles. This represents the position of minimum inductance, denoted as $L_{min}$. As the rotor rotates, the inductance varies between the extremes of $L_{max}$ and $L_{min}$, giving the idealised form shown in FIG. 3. Typically, the rotor and the stator have the same axial length and the flux paths within them are notionally the same at any cross-section along that axial length. The axial lengths of the cores are often denoted as the 'active length' of the machine, the end-turns of the windings lying outside the active length at both ends of the machine.

A schematic flux path is shown in FIG. 5 and, while this considerably simplifies the complexity of the actual paths, it illustrates that the flux passes through the back-iron of the rotor as well as through the rotor poles, i.e. the back-iron region of the rotor is an integral part of the magnetic circuit associated with the phase winding. The flux path is essentially 2-dimensional. It will also be clear from FIG. 5(b) that the minimum inductance is heavily dependent on the length of the air path from the stator poles to the rotor back iron. FIG. 6 shows a sketch of the conventional shape of a two-pole rotor with the back iron section marked as region A.

In simple terms, the torque produced by a switched reluctance machine is proportional to the difference between $L_{max}$ and $L_{min}$. The skill of the designer is brought to bear on the task of maximising this difference by increasing $L_{max}$ and reducing $L_{min}$. However it will be seen that while reducing the rotor back-iron will tend to reduce $L_{min}$, it will also reduce $L_{max}$, so there is limited scope for improvement in this region.

U.S. Pat. No. 5,828,153 (McClelland), incorporated herein by reference, discloses a rotor of shaped lamination material in a particular type of switched reluctance machine with an external rotor.

Attempts to reduce $L_{min}$ by changing the direction of the flux path are generally hampered by the need to laminate the material to contain the losses. US Patent Application No 2004/0070301 (Mecrow), incorporated herein by reference, discloses an arrangement of rotor segments which have to be assembled on a shaft. These systems inevitably introduce mechanical complexity into the rotor design.

There is therefore an ongoing need for a cost-effective rotor design which reduces $L_{min}$ without significantly reducing $L_{max}$.

Soft magnetic composite (SMC) material is a magnetisable material based on iron powder. It is generally pressed into the required finished shape rather than being punched and/or machined. Developments in powder metallurgy techniques have produced bonding agents which coat the iron powder and keep the resistivity high, so that the eddy currents in the material are reduced when the material is exposed to time varying flux. The material can be placed into a die and pressed to form the required component at pressures up to 800 MPa. The resulting components are then subjected to heat treatment at temperatures up to 500° C. A summary of material properties is given in "Soft Magnetic Composites—Materials and Applications", Hultman & Jack, IEMDC Conference, Madison, Wis., USA, 1-4 Jun. 2003, Vol. 1, pp. 516-523, which is incorporated herein by reference.

In recent years, prototype designs have been proposed for permanent magnet, synchronous and reluctance machines which employ SMC material in some parts of the magnetic circuit. For example, "An Iron Composite Based Switched Reluctance Machine", Alakula et al., Stockholm Power Tech, 18-22 Jun. 1995, Vol. 3, pp. 251-255, incorporated herein by reference, replaces the conventional laminations with SMC material, keeping the basic magnetic geometry unchanged. This project, however, failed to demonstrate any advantage over a conventional machine. A similar approach was taken in the work reported in "Design of a High Speed Switched Reluctance Generator for Aircraft Applications", Duhayon et al, ICEM 2002, International Conference on Electrical Machines, 25-28 Aug. 2002, Brugge, Belgium, incorporated herein by reference. In general, it has been the intention of the designer to produce an item at least partly in SMC that is a mechanical, as well as functional, equivalent of a pre-existing rotor. No attempt has been made to exploit a soft magnetic material that can be formed without the limitations of laminations to address issue of increasing the difference between $L_{max}$ and $L_{min}$.

SUMMARY OF THE INVENTION

The present invention is defined in the accompanying independent claims. Preferred features of the invention are recited in the claims respectively dependent thereon.

The inventors have appreciated that the application of SMC to switched reluctance structures requires a radical change in the conventional rotor shape in order to exploit the properties of the material and produce an improved rotor.

Embodiments of the present invention generally relates to a rotor for a variable reluctance machine, for example a switched reluctance machine, that has a core portion and at least two rotor poles, each extending axially from the core portion, wherein the poles are made from unlaminated magnetisable material. An example of such a material is SMC which can be moulded into a desired shape.

In one form, the core portion is also made from unlaminated magnetisable material.

An embodiment of the invention has the rotor poles arranged about an axis of rotation and extending axially from the core portion. By displacing the core portion, the rotor poles can be arranged in free space. The flux path has a third dimension in which flux travels generally along the rotor poles and through the core portion at one or both ends of the rotor poles.

The core portion can comprise an annulus and/or a series of radial limbs on which the rotor poles are arranged. The poles themselves can be created integrally with the core portion (e.g. by moulding) or secured to the core portion after manufacture, such as by a keyway and slot form of engagement. Other forms of securement are also possible as will be readily apparent to the person of ordinary skill in the art. For example, the components could be secured together using a suitable adhesive, such as a cyanoacrylate adhesive.

In one form, the rotor is made from two mouldings that have formed with each of them a proportion of the total number of rotor poles. The two moulded forms are brought together so that the rotor has core portions at either end. Each moulding of such a rotor can have a substantially identical shape and carry half the total number of rotor poles.

Embodiments of the invention achieve a large difference between $L_{min}$ and $L_{max}$ because the magnetic circuit between rotor poles is displaced beyond the active extents of the rotor poles, thereby reducing $L_{min}$.

Other aspects and advantages of the invention will become apparent upon reading the following detailed description of exemplary embodiments of the invention and upon reference to the accompanying drawings.

BRIEF DESCRIPTION OF THE DRAWINGS

FIG. 9(a) shows the components of a further embodiment;

FIG. 9(b) shows the assembly of the components of FIG. 9(a);

FIG. 10(a) shows the components of another embodiment;

FIG. 10(b) shows the assembly of the components of FIG. 10(a);

FIG. 11(a) shows the components of another embodiment;

FIG. 11(b) shows the assembly of the components of FIG. 11(a);

FIG. 12(a) shows the components of another embodiment;

FIG. 12(b) shows the assembly of the components of FIG. 12(a);

DESCRIPTION OF THE PREFERRED EMBODIMENTS

Figure 7:
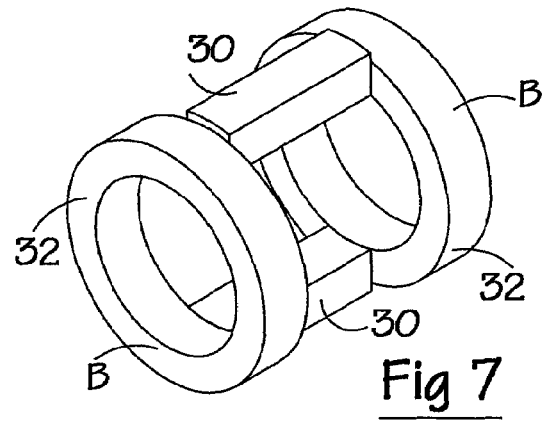
FIG. 7 shows a rotor according to one embodiment.

In order to achieve a large reduction of $L_{min}$ (and hence increase the torque produced for a given excitation), the invention uses one or more 'back iron' core portions B to connect the ends of the two rotor poles 30 in a rotor for a variable reluctance machine, as shown in FIG. 7. In this embodiment, the pair of rotor poles 30 are connected at their axial ends by annular rings 32. The rotor is pressed from SMC in this embodiment. It will be seen that core portions B lie outside the axial extent of the rotor poles and outside a direct line between them. The flux path is shown schematically in FIG. 8(a). FIG. 8(b) shows the same rotor arranged in relation to a stator S with windings W. The rotor rotates about an axis denoted by the line X-X. It will be clear from FIG. 8(b) that, while the flux pattern in the airgap region in the aligned position is virtually unchanged, the gap between the stator poles in the unaligned position is very large because of the lack of magnetisable material diametrically between the rotor poles. The flux path is now removed to the core portions at each end of the motor. If the shaft on which the rotor rotates is made from a non-magnetic material, then the flux, and hence the inductance, in the unaligned position will be very small, thus achieving the goal of reducing $L_{min}$ without significantly changing $L_{max}$. It will be noted that the magnetic circuit associated with the phase winding is now described in three dimensions, rather than two.

Figure 8A:
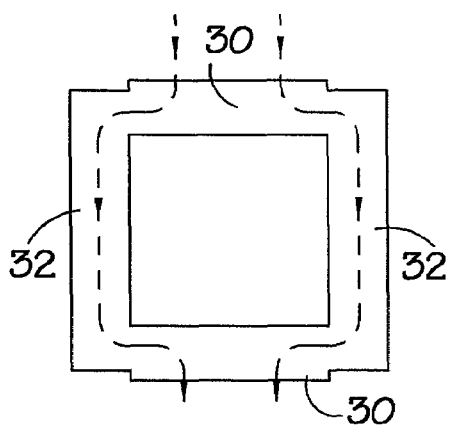
FIG. 8(a) shows a cross section of the rotor of FIG. 7.
Figure 8B:
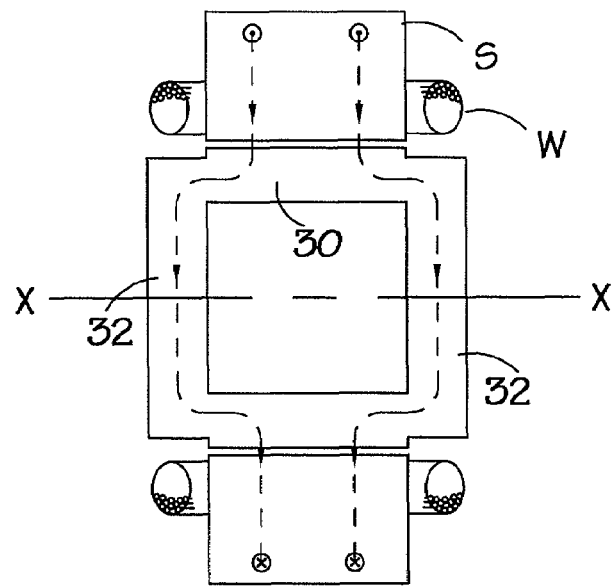
FIG. 8(b) shows the rotor of FIG. 8(a) in relation to a stator.

FIGS. 7, 8(a) and 8(b) can be considered as embodiments showing the essential technical elements. It will be seen that it would not be practicably possible to make the shape in FIGS. 7 and 8 from laminations, though it would be possible, if technically difficult, to mould it.

FIGS. 9(a) and 9(b) show an embodiment of a four pole rotor moulded in SMC material. A suitable form of SMC for this purpose is Somalloy 500 which is made by Hoganas AB of Hoganas, Sweden. This is suitable for any of the embodiments disclosed herein. The rotor comprises the two identical parts of FIG. 9(a) produced from the same mould and assembled as shown in FIG. 9(b). Each part comprises a moulded annular end ring 34, constituting the core portion, which is also formed with a pair of diametrically opposed rotor pole members 36 with outward facing arcuate pole faces. Appropriate non-magnetic mountings are used to hold them relative to a shaft, as understood by the skilled person. While the dimensions of the components would be chosen in the light of the particular requirements for any design, particularly those dimensions defining the cross-section of the magnetic path and the axial distance between the end rings, the basic design feature of having the connection component for the rotor poles lying outside the axial extent of the stator or rotor poles is maintained.

FIGS. 10(a) and 10(b) show a further embodiment, again using two identical components to provide a four pole rotor. In this embodiment, the back iron parts 38 are 'X' shaped, having four limbs 40. A pair of limbs has a rotor pole 42 extending from it. The core portion is now a cruciform shape, which allows a bore 44 or other mounting means, such as a boss, to be formed in the moulding. In this embodiment, the bore 44 receives a non-magnetisable shaft 46 about which the rotor can rotate.

FIGS. 11(a) and 11(b) show a further embodiment which allows the moulded components to be clipped together. The cruciform shape of the core portion is now completed only when the rotor is assembled. In this embodiment each part of the rotor comprises a first full length back iron component 48 from which extend opposed rotor poles 50. A second partial back iron component 52 depends from the end of each rotor pole 50 so that the pair face each other across a gap that is of the same dimension as the corresponding lateral thickness of the full length back iron component 48.

As shown in FIG. 11(b) when a pair of the rotor components are mated together mutually at right angles the combination of full length and partial back components create a complete rotor back irons at each end of the rotor poles. A bore 54 for a rotor shaft 55 is formed in each of the full length back iron components 48 similarly to the mounting arrangement provided in the previous embodiment.

A yet further embodiment is shown in FIGS. 12(a) and 12(b), where keys, in the form of dovetails 56, are formed in the radially inner surface of each rotor pole 42'. These engage with complementary keyways 58 in the ends of the limbs of the core portion 40'. This arrangement enables the rotor poles to be held securely against centrifugal forces. This embodiment is suitable for use at high speeds. The rotor is still composed of two identical components and the component shape can be moulded in one operation. Instead of, or in addition to, the use of keyways to hold the components together, other forms of securement are possible, for example a suitable adhesive such as a cyanoacrylate adhesive.

Figure 13:
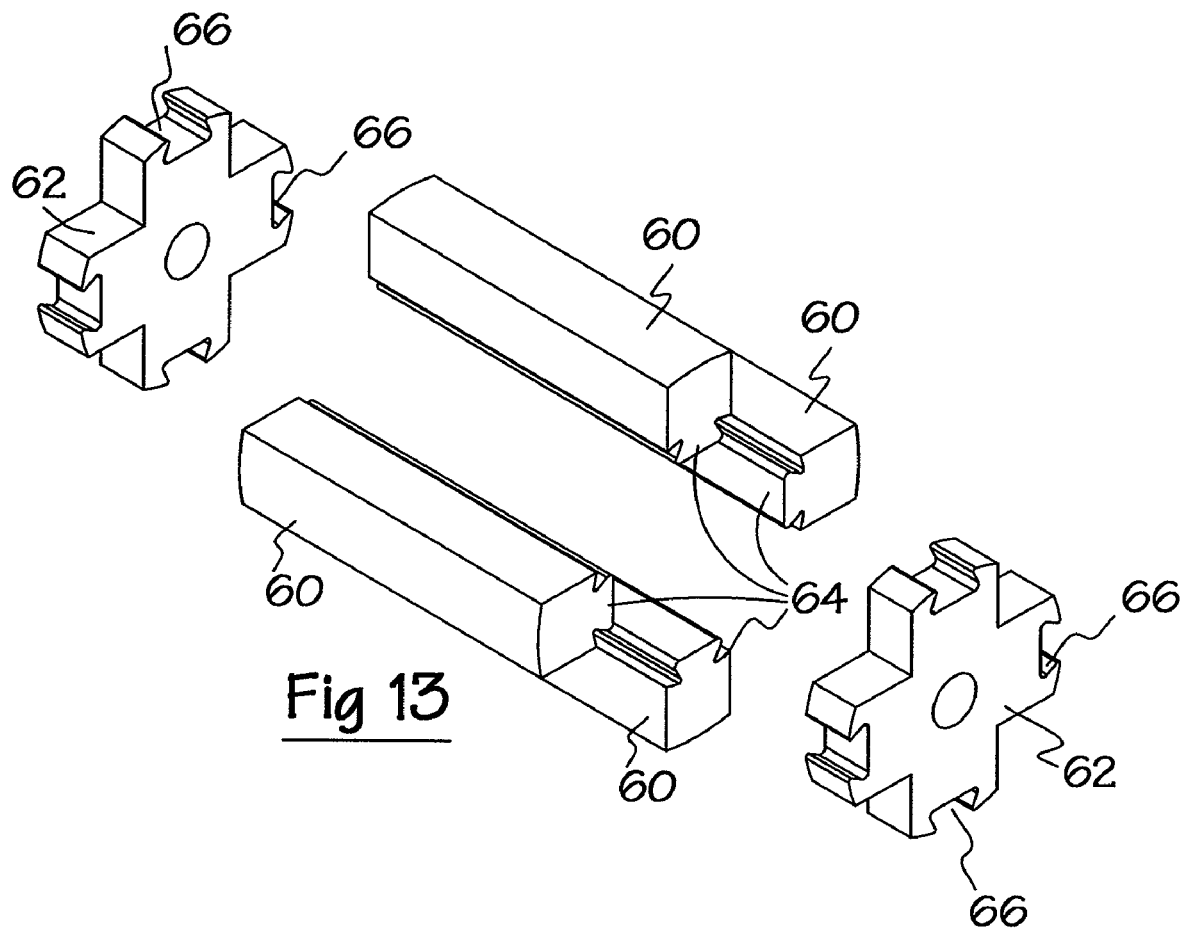
FIG. 13 shows an alternative set of components for the rotor of FIG. 12(a)

It is, of course, possible to subdivide the basic component, for example as shown in FIG. 13. In this embodiment, the rotor poles 60 are formed separately from the core portions 62. As with the previous embodiment, the poles 60 are keyed to the core portions 62 using dovetails 64 on the inner surface of each pole which engage with slots 66 on each corresponding limb of the core portion 62. Two moulds are now required, one to produce the poles 60 and one for the core portions 62. Magnetically, this embodiment blends together the poles and the end regions. While this approach increases the assembly time for the rotor, it may enable lower tooling costs as the moulds are less complex than that required to produce the component of FIG. 12, for example.

A further embodiment uses only one core portion, with all the poles attached to it. Such an embodiment can be moulded in one piece. It could take the form of one of the components shown in, for example, FIG. 9(*a*) or generally like one of the components shown in FIG. 10(*a*). While this is more difficult to mount stably on a shaft and keep centred on the axis, it offers a lower-cost alternative which would be particularly suitable for small machines.

Figure 16:
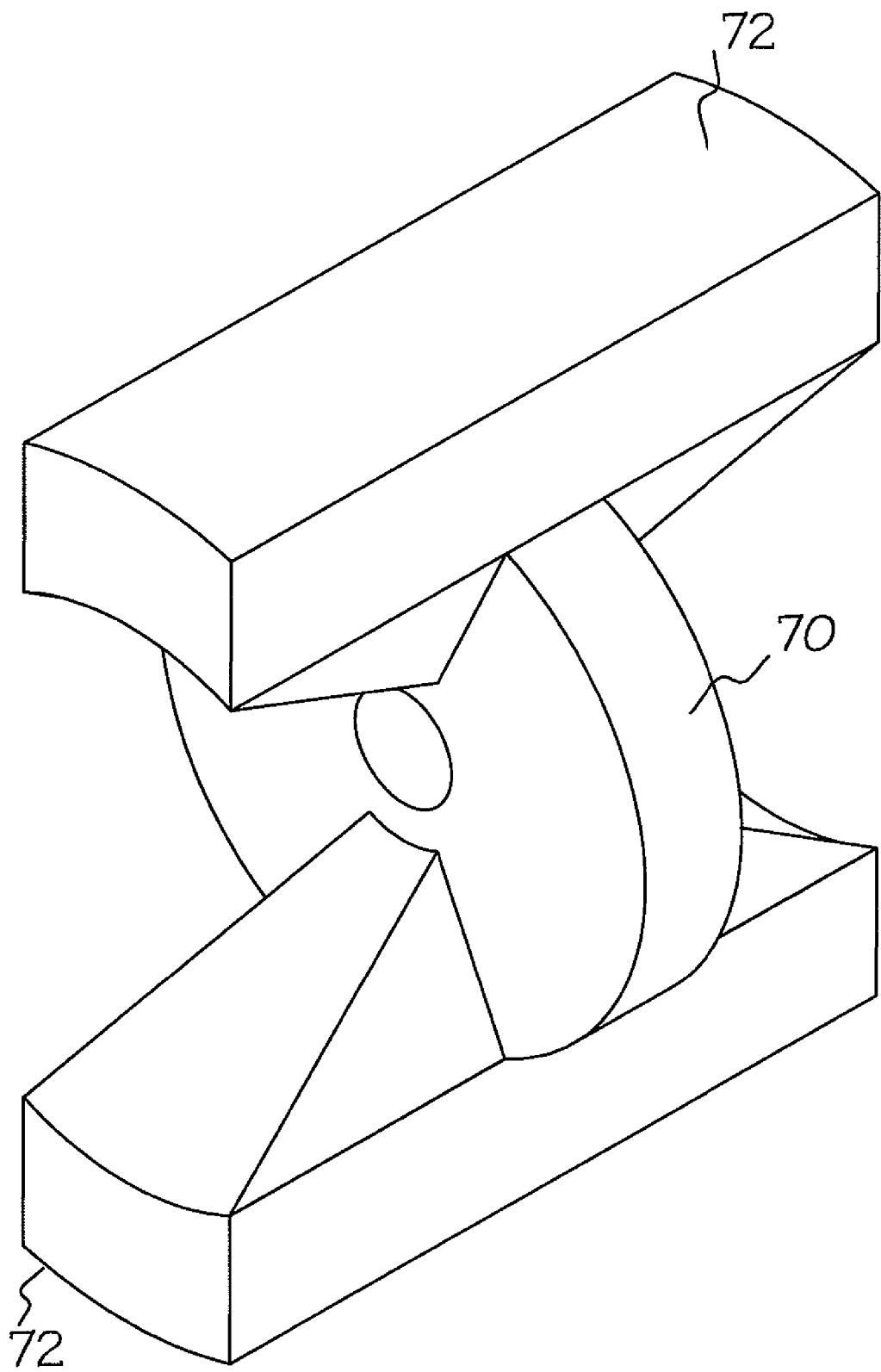
FIG. 16 shows an alternative form of rotor.

FIG. 16 illustrates another form of the invention. In this embodiment the rotor illustrated has a single core portion 70. Each rotor pole 72 extends axially from the core portion 70. As shown, the parts of each rotor pole extend equally on either side of the core portion 70. In other embodiments each rotor can extend to one side or by different amounts on each side, subject to mechanical limitations of the material and the working conditions.

Figure 1:
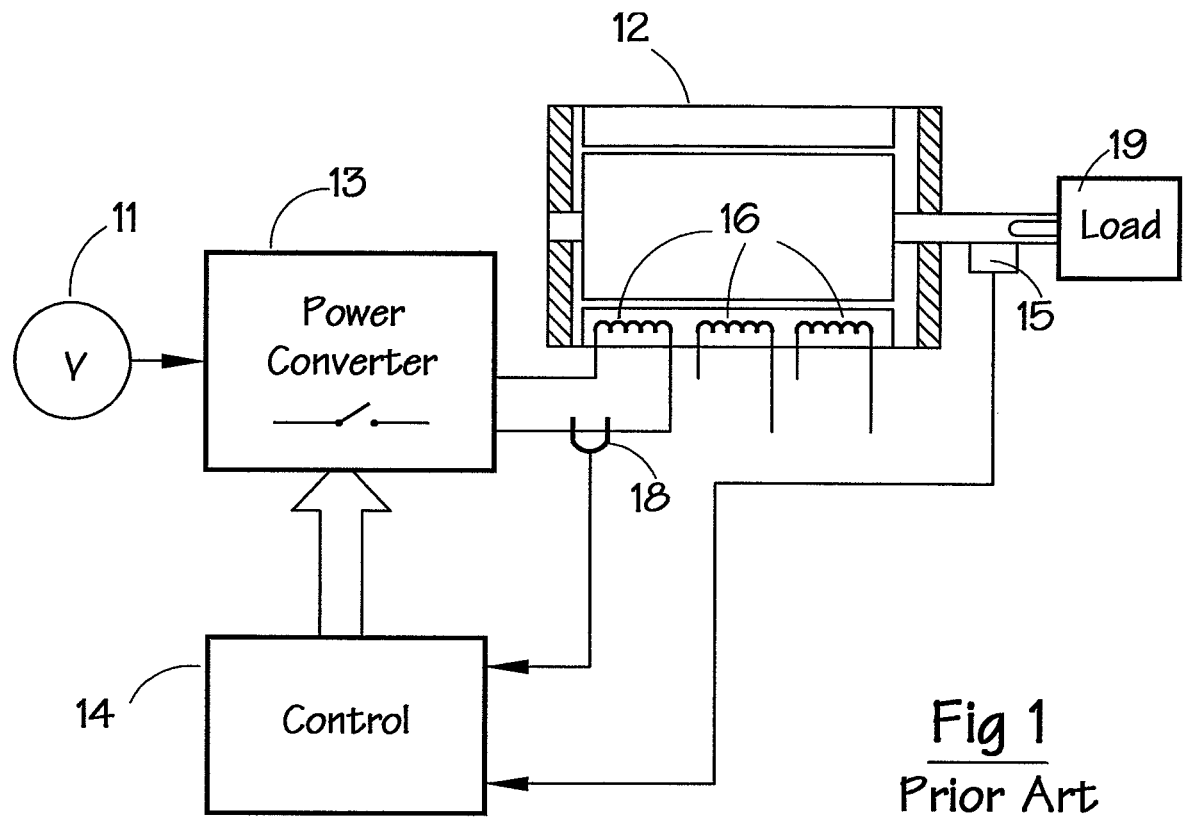
FIG. 1 shows a schematic drawing of a switched reluctance drive system.
Figure 2:
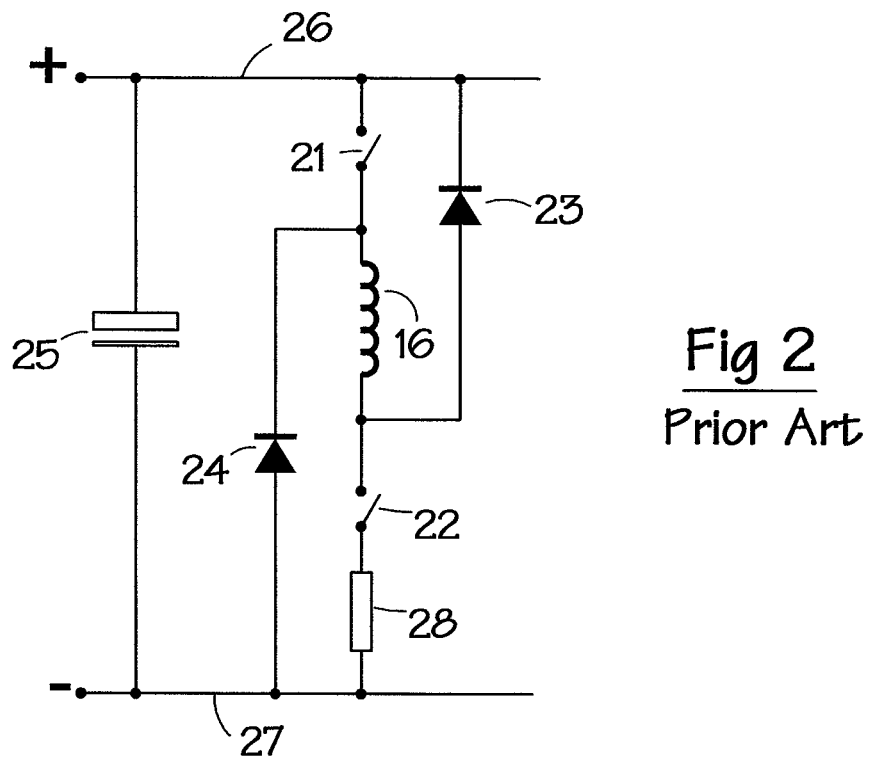
FIG. 2 shows a typical power circuit topology for the drive of FIG. 1.
Figure 3:
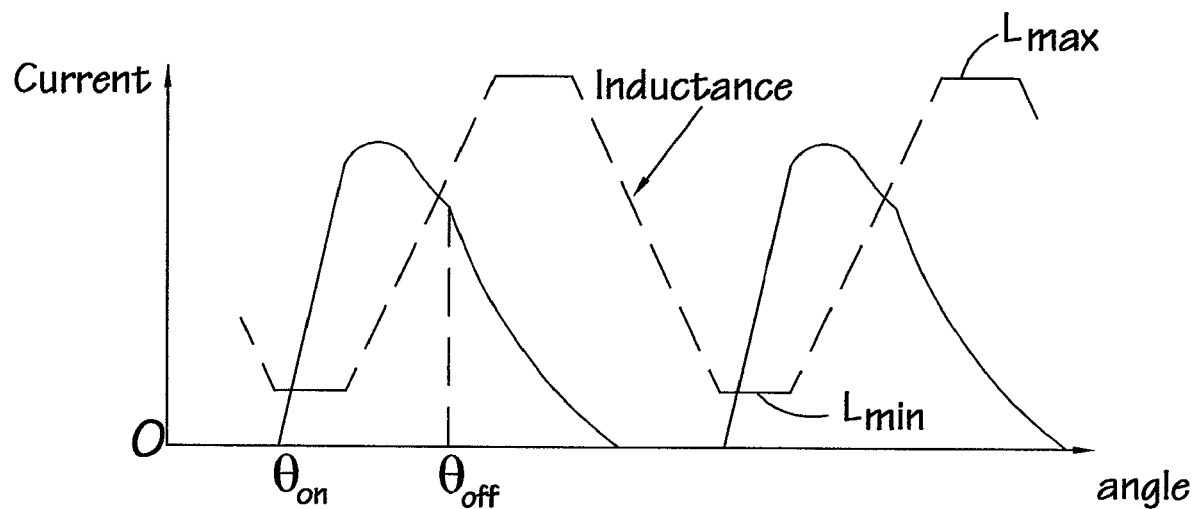
FIG. 3 shows an inductance profile and current waveform of a typical switched reluctance machine.
Figure 4:
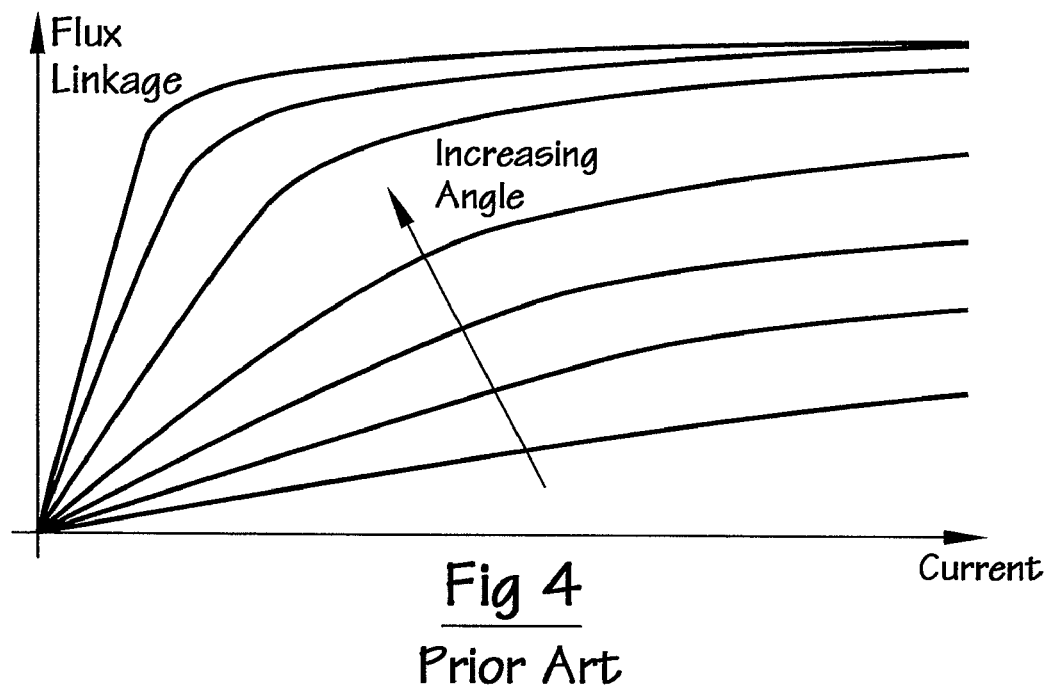
FIG. 4 shows the flux-linkage and current relationship for a typical switched reluctance machine.
Figure 5A:
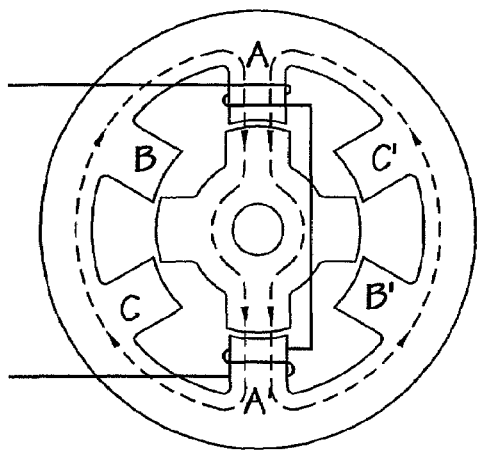
FIG. 5(a) shows a typical cross-section of a reluctance machine in the aligned position.
Figure 5B:
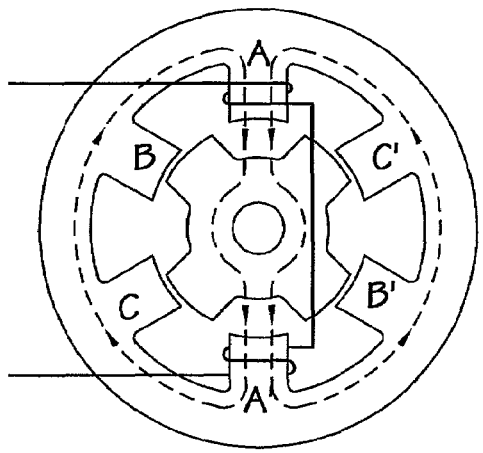
FIG. 5(b) shows a typical cross-section of a reluctance machine in the unaligned position.
Figure 6:
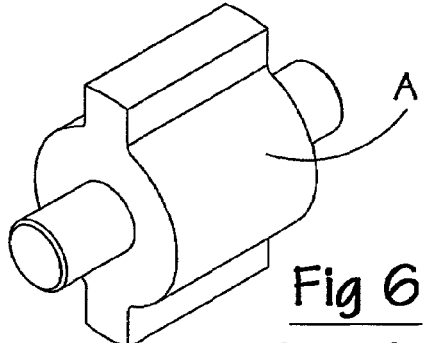
FIG. 6 shows a prior art 2-pole rotor for a switched reluctance machine.
Figure 14:
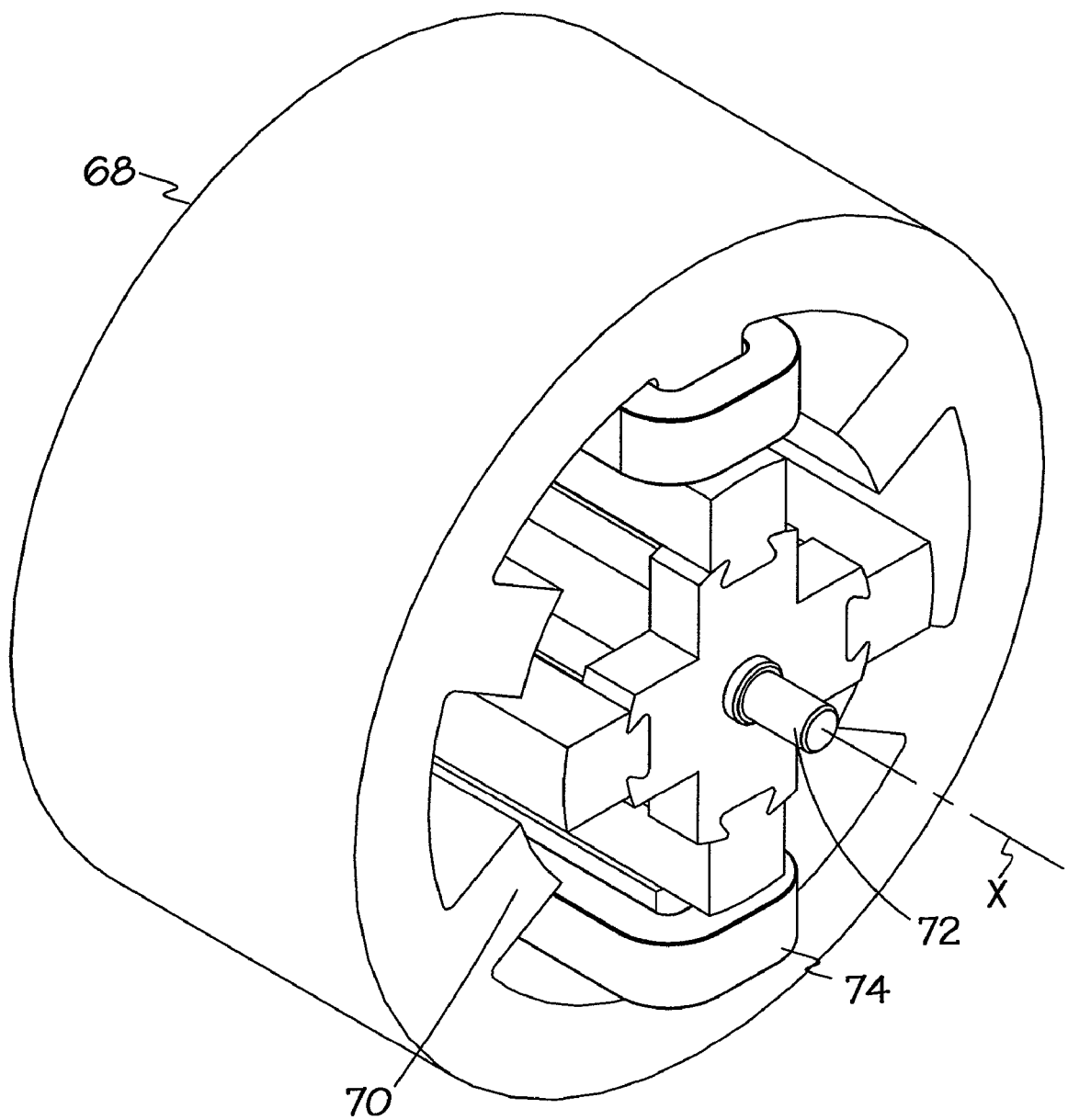
FIG. 14 shows a variable reluctance machine including a rotor as described.

FIG. 14 shows a variable reluctance machine in which the rotor of FIG. 13 is used. It uses a typically arranged stator 68 of laminated steel having six stator poles 70 arranged about a machine axis X. The stator poles each carry a stator winding 74, four of which are omitted for clarity. The rotor is mounted on a non-magnetic shaft 72, such as stainless steel, about the same axis X. Operation of the machine of FIG. 14 is in accordance with established principles of variable reluctance machine control. For example, it could be run as a switched reluctance motor or generator using the system and circuit of FIGS. 1 and 2, respectively.

Referring back to FIGS. 8(*a*) and (*b*), it will be seen that the rotor extends axially beyond the axial extent of the stator by a distance more or less equal to the axial thickness of the rotor core portion. This is the same at both ends of the machine of FIG. 14.

Figure 15:
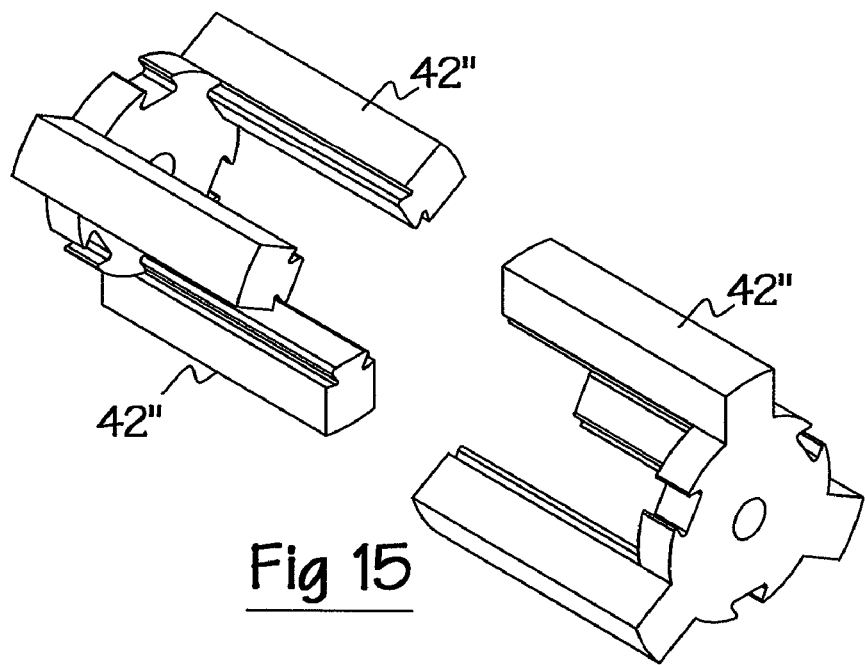
FIG. 15 shows the components of a 6-pole rotor embodiment.

The invention is not limited to a particular number of rotor poles. For example, FIG. 15 shows a 6-pole rotor suitable for use with, say, an 8-pole stator for a 4-phase system. Like the other embodiments, the poles are equally angularly spaced about the axis of rotation. The rotor poles 42" of one moulding are keyed to the limbs of the core portions of the other moulding. The rotor can be formed from two identical components as shown or from a pair of end discs and six pole pieces. A rotor made of unlaminated magnetisable material in accordance with the invention could be used in substitution for virtually any existing conventional laminated rotor.

While the rotor is described as being moulded it could be formed in other ways, such as machining. Likewise, the material can be any unlaminated magnetisable material other than the Somalloy 500 described.

The rotor could optionally be fabricated from a combination of moulded and laminated material, for example the poles could be moulded and the core portion formed from laminations of electrical sheet steel. The poles could be fastened to the core by known means, e.g. by means of plugs on the poles received in sockets in the core portion or vice versa.

Also, while the invention has been described in terms of a rotating machine, the invention is equally applicable to a linear machine having a stator in the form of a track and a moving part moving on it. The word "rotor" is used in the art to refer to the movable part of both rotating and linear machines and is to be construed herein in this way. Accordingly, the above description of several embodiments is made by way of example and not for the purposes of limitation to rotating systems.

The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A rotor for a variable reluctance machine, the rotor defining an axis of rotation about which the rotor can rotate, said rotor comprising:
    a core portion comprising magnetizable material; and
    at least two rotor poles, each pole having:
        an axial extent parallel to the axis, said axial extent being defined by a first and a second axial end of the rotor pole, and
        a radial extent at right angles to the axis, said radial extent being defined by a radially inner face and a radially outer face of the rotor pole, each rotor pole being attached to the core portion at the first axial end,
    wherein at least the rotor poles are made from unlaminated magnetizable material, the core portion forms part of a magnetic circuit of a phase of the variable reluctance machine and the magnetic circuit extends from a first rotor pole of the rotor poles into the core portion and from the core portion into a second rotor pole of the rotor poles, said second rotor pole being diametrically opposite said first rotor pole, and wherein the radially inner faces of the rotor poles define a space, the space having no magnetizable material therein.

2. The rotor as claimed in claim 1 in which the core is also made from unlaminated magnetizable material.

3. The rotor as claimed in claim 1 in which at least the rotor poles are moulded from the unlaminated magnetizable material.

4. The rotor as claimed in claim 3 in which the magnetizable material is soft magnetic composite ('SMC').

5. The rotor as claimed in claim 1 in which the radially outer faces are arcuate centred on the axis.

6. The rotor as claimed in claim 1 in which the rotor comprises first and second core portions, the rotor poles extending between the first and second core portions, wherein each rotor pole is attached to the second core portion at the second axial end.

7. The rotor as claimed in claim 6 in which at least some of the rotor poles are a unitary item with one of the core portions.

8. The rotor as claimed in claim 6 in which a first proportion of the rotor poles are a unitary item with the first core portion and a second proportion of the rotor poles are a unitary item with the second core portion.

9. The rotor as claimed in claim 7 in which the first and second core portions are of substantially identical shape.

10. The rotor as claimed in claim 1 in which the rotor comprises a single core portion, the rotor poles extending axially from the core portion.

11. The rotor as claimed in claim 10 in which the rotor poles are separate items secured to the core portion.

12. The rotor as claimed in claim 1 in which the core portion is annular and from which the rotor poles extend in an axial direction.

13. The rotor as claimed in claim 1 in which the core portion or each portion defines radial limbs from which the rotor poles extend in an axial direction.

14. The rotor as claimed in claim 1 also including a non-magnetic shaft defining an axis of rotation therefor.

15. A machine including the rotor as claimed in claim 6, said machine also including a stator having first and second stator poles, the core portions being arranged at each end of the stator such that a magnetic circuit created by the rotor and stator includes a flux carrying portion of the rotor which extends axially beyond the stator poles such that in use, flux flows from the first stator pole to the first rotor pole, from the first rotor pole through the core portions to the second rotor pole, from the second rotor pole to the second stator pole, and from the second stator pole through the stator back to the first stator pole, wherein the second stator pole is diametrically opposite the first stator pole.

16. The machine as claimed in claim 15 arranged to run as a rotary machine, whereby the rotor rotates within the stator and the portion of the magnetic circuit extends axially beyond the rotor poles.

17. A variable reluctance machine comprising:
a stator having first and second stator poles; and
a rotor disposed for rotation within said stator about an axis of rotation, said rotor comprising:
a core portion comprising magnetizable material; and
at least two rotor poles, each pole having:
an axial extent parallel to the axis, said axial extent being defined by a first and a second axial end of the rotor pole, and
a radial extent at right angles to the axis, said radial extent being defined by a radially inner face and a radially outer face of the rotor pole, each rotor pole being attached to the core portion at the first axial end,
wherein at least the rotor poles are made from unlaminated magnetizable material and the rotor is arranged for rotation within the stator such that in use, flux flows from the first stator pole to a first rotor pole of the rotor poles through the respective radially outer face, from the first rotor pole through the respective first end to the core portion, from the core portion to a second rotor pole of the rotor poles through the respective first end, from the second rotor pole through the respective radially outer face to the second stator pole, and from the second stator pole through the stator back to the first stator pole, the first rotor pole being diametrically opposite the second rotor pole, and wherein the radially inner faces of the rotor poles define a space, the space having no magnetizable material therein.

18. A variable reluctance machine comprising:
a stator having first and second stator poles; and
a rotor disposed for rotation within said stator, said rotor comprising:
a core portion comprising magnetizable material; and
at least two rotor poles, each extending axially from the core portion, wherein the at least two rotor poles are made from unlaminated magnetizable material, and wherein the core portion is arranged at an end of the stator such that a magnetic circuit formed by the rotor and stator includes a flux carrying portion of the rotor which extends axially beyond the stator poles, such that in use, flux flows from a first stator pole to a first rotor pole of the rotor poles, from the first rotor pole through the core portion to a second rotor pole of the rotor poles, from the second rotor pole to the second stator pole, and from the second stator pole through the stator back to the first stator pole, wherein the first rotor pole is diametrically opposite the second rotor pole, and wherein the rotor defines a space in which there is no magnetizable material such that when the rotor is in a rotational position of minimum inductance, there is no magnetizable material between diametrically opposed stator poles.

19. The machine of claim 18 wherein the rotor comprises first and second core portions arranged at each end of the rotor, and wherein the at least two rotor poles extend between the first and second core portions.

* * * * *